UNITED STATES PATENT OFFICE.

HENRY MONTAGUE CROWTHER, OF SALT LAKE CITY, UTAH.

PROCESS OF EXTRACTING SALTS FROM SOLUTIONS.

No. 877,912. Specification of Letters Patent. Patented Feb. 4, 1908.

Application filed August 17, 1907. Serial No. 389,003.

*To all whom it may concern:*

Be it known that I, HENRY MONTAGUE CROWTHER, residing at Salt Lake City, county of Salt Lake, and State of Utah, have invented new and useful Improvements in Processes of Extracting Salts from Solutions, of which the following is a specification.

The invention relates to the process of removing, exposing and concentration by reduction of volume, by greatly increasing evaporation of liquids containing in natural or artificial solution, small quantities of soluble metals or other elements or compounds and combinations of elements, such as sulfates of copper, iron, silver, etc. etc. in waters from mines, springs, streams, or bodies of water, or the different metallurgical or chemical processes and the soluble elements, salts borax, soda etc. in sea water, springs, streams and liquids generally, containing dissolved therein certain quantity of metals and other elements and compounds or combinations of elements.

In recovery of the dissolved metals etc. in liquids containing but small quantity of same in solution, in great bulk of liquid it is first necessary to reduce the bulk of liquid by artificial or natural evaporation, by boiling or heating artificially in receptacles or exposing in ponds or reservoirs to action of sun and air, but this method is expensive, slow and even not available in case of liquids containing much undissolved and suspended solid matter and sediment which would settle and contaminate the soluble product of evaporation unless previously removed. Instead of such ordinary means of concentration of such liquids by evaporation, I employ the agency of any suitable absorbent material, such as cloth, blotter paper, cotton waste, sand, porous brick etc., so arranged that only a portion of the absorbent material may come in contact with the surface of said liquids or solutions, when capillary action draws up only the liquid portion of said solutions or liquids, at same time their contained metals etc., in solution and then by providing a more or less great spread of said absorbent material, loosely arranged to expose greatest surfaces to evaporation, I increase the natural or artificially assisted evaporation one hundred fold more or less, which causes crystals or deposits of solid salts or acids or bases of metals and other elements and compounds or combinations of elements to gather on and in the said absorbent material, which product may then be shaken free or washed out of said absorbent material, into special receptacles, and recovered in such concentrated form, ready for any suitable final treatment. This process also to include the direct precipitation of the soluble salts of metals, etc. in the case of certain metals, if desired, by placing, within, about and associated with said absorbent material, some suitable precipitant such as metallic iron, sodium carbonate, ammonium sulfid, etc., the action of which is to chemically form an insoluble form of any soluble salt in solution, in said liquids that may be drawn in contact with said precipitant, by virtue of the capillary action exercised by the said absorbent material properly arranged.

The action of the absorbent material is to either or both, cause to be evaporated to dryness the liquids acted upon, and deposit their load of dissolved metals, etc., in solid form within, about and upon the absorbent material or by concentrating the said liquids or solutions to much less bulk, by evaporation, and consequent necessary increase of percentage of metals, etc. in solution, to more readily cause the soluble salts, etc., to be precipitated by the precipitant associated with the said absorbent material.

By means of this process, in case of copper laden waters, for instance, from mills, works, and mines containing too small an amount of metal in solution to be precipitated and recovered profitably without prohibitively expensive filtering and costly evaporation, the copper in solution, may be recovered both as solid crystals or deposit of copper sulfates forming in, and on said absorbent material and also as metallic copper or insoluble sulfids, carbonates, etc., by the contact of the partially evaporated and consequently concentrated liquids containing the dissolved metals and the said precipitant mixed with the absorbent material.

To illustrate one of many methods of applying the principle of this process: Take a large shallow cone, open at large end, made of porous canvas or cloth, and suspend it by the large open end or mouth, from a support, and fill it, (the cone) loosely to a depth of about twelve inches, with broken bricks, cotton waste or other absorbent material, mixed with the precipitant, say small bits of scrap iron, then adjust the cone, as filled, above the liquid containing copper salts in solution, (which may be mill tailings water containing much undissolved sediment in suspension) so that the point or apex of said cone is slightly submersed in said liquid, when capilliary action will draw up the said liquid and its copper in solution and filter it at same time, also greatly spread and increase the evaporating surface and as it partially or wholly evaporates, the consequent concentration of said liquids, will so increase the percentage of copper salts in solution, that said copper salts will precipitate as metallic copper upon coming in contact with the iron or in case of any liquids not coming in contact with the precipitant, the said copper salts in solution, will form as crystals or deposit of copper salts, upon the completion of evaporation of said liquids drawn up and exposed by capilliary action of said absorbent material. The whole action being automatic and continous, until said absorbent material is fully loaded with metallic copper and copper salts when these are removed and said absorbent, cleaned or replaced with new material. As another illustration of the principle of this process: Take a common absorbent building brick and saturate it with a more or less strong solution of carbonate of soda and let it partially dry out, then suspend it lengthwise over a vessel containing liquid wherein is dissolved a quantity of copper salts,—preferably a very small percentage,—let the end of the brick be slightly submersed in the liquid, when capillary action will continually draw up the liquid, at same time filtering it, and increase its evaporation surface that end of brick occupies, by many fold and simultaneously precipitate the copper salts in the liquid as copper carbonate, which is insoluble and eventually completely saturate brick or any other absorbent material that may be used, with carbonate of copper, when said brick or material may be treated to remove the copper.

No claim is made as to originality of the precipitant when used nor the absorbent material, but this process relates to combination of great increase of surface evaporation, filtration by application of capillary action to surface of any liquids and simultaneous formation and precipitation of solid, recoverable crystals of salts, bases or acids of metals, minerals, or compounds and combinations of elements and elements, which may be at same time converted into metallic or other insoluble or desired form by such concentration and precipitation by use of suitable reagents associated with said absorbent material.

I claim:

The process of extracting from liquids, or solutions, and waters, any dissolved metals, salts, compounds and combinations of elements, by greatly increasing surface evaporation by the application of any suitable absorbent material so arranged as to touch the surface of the liquid or solution and water under treatment, bringing into play the capillary action of said absorbent material to raise, spread and expose, and greatly increase surface evaporation, causing first concentration or reduction of volume of said liquids and finally evaporation to dryness, leaving deposit of solid, recoverable salts, previously in solution, also the association and mixture of reagents or chemical precipitants, in, with, and about the said absorbent material, to simultaneously effect the transformation of insoluble forms of the soluble forms of any metals, salts, etc. in the liquids, under treatment, such transformation and precipitation occurring in, with and about said absorbent material, substantially as herein described.

HENRY MONTAGUE CROWTHER.

Witnesses:
 J. CROWTHER,
 GENEVE HORLICK.